March 18, 1969  B. W. BLUNK ET AL  3,433,004
COTTON RETRIEVING ATTACHMENT
Filed March 4, 1966  Sheet 1 of 3

Boyde W. Blunk
Frank Owen III
INVENTORS

BY *Clarence A. O'Brien*
*and Harvey B. Jacobson*
Attorneys

Boyde W. Blunk
Frank Owen III
INVENTORS

Boyde W. Blunk
Frank Owen III
INVENTORS

United States Patent Office 3,433,004
Patented Mar. 18, 1969

3,433,004
COTTON RETRIEVING ATTACHMENT
Boyde W. Blunk, Dell City, and Frank Owen III, El Paso, Tex.; said Frank Owen III, assignor to M & K Leasing Company, a corporation of Texas
Filed Mar. 4, 1966, Ser. No. 532,008
U.S. Cl. 56—119    5 Claims
Int. Cl. A01d 45/18

ABSTRACT OF THE DISCLOSURE

A retrieving attachment for the gathering shoe of a cotton picking machine comprising a flat mounting plate affixed to the leading portion of the gathering shoe and including an adjustable vertically orientated flat plow blade portion on the leading end thereof. A gathering rod is affixed to the plow blade and extends forwardly and downwardly therefrom, and a plurality of lift rods are fixed to the inner side edge of the mounting plate and extend inwardly, upwardly and rearwardly thereof for an inward directing of the gathered crops.

---

The instant invention generally relates to cotton retrieving machines such as cotton pickers or cotton strippers, and is more particularly concerned with a cotton retrieving attachment utilized in conjunction with such machines so as to increase the cotton retrieving efficiency thereof.

It is a primary object of the instant invention to provide an attachment which is readily mountable on the gathering shoes or boots normally associated with cotton pickers or cotton strippers and which, when mounted and adjusted, is capable of efficiently and effectively recovering all of the cotton including that which may have fallen on the ground.

Another significant object of the instant invention is to provide a cotton retrieving attachment which is capable of being quickly adjusted so as to enable a proper location of the gathering portion thereof regardless of the particular machine upon which the attachment is mounted.

Also, it is a significant object of the instant invention to provide an attachment which, in addition to gathering the cotton, also acts so as to laterally direct, through a plow blade portion provided thereon, the dirt and rocks from the cotton receiving portion of the machine so as to enable the recovery of a substantially clean product.

Also, it is a significant object of the instant invention to provide a cotton retrieving attachment which incorporates stalk lifting rods so as to insure a proper introduction of the stalk into the machine.

In achieving the above objects, the attachment of the instant invention basically includes a mounting plate having a combination plow and gathering unit adjustably mounted on the forward end thereof for both vertical and lateral adjustment in a manner so as to insure a proper engagement of the gathering portion, which is in the nature of a forwardly curved rod, approximately ¼" below the surface of the earth so as to produce a complete retrieving of the cotton and a positive inward directing of the stalks. In addition, the mounting plate has a plurality of lifting rods secured along the inner edge thereof which engage and provide for a continued inward directing of the stalks as the machine advances. Finally, means is provided for securing the attachment, through the mounting plate, to one of the machine gathering shoes, one such attachment being mounted upon each of the shoes, such shoes being normally provided in cooperating pairs. This means is to be such so as to enable a rapid and positive engagement of the attachment, and will consist basically of a shoe engaging stirrup and a plurality of mounting bolts.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
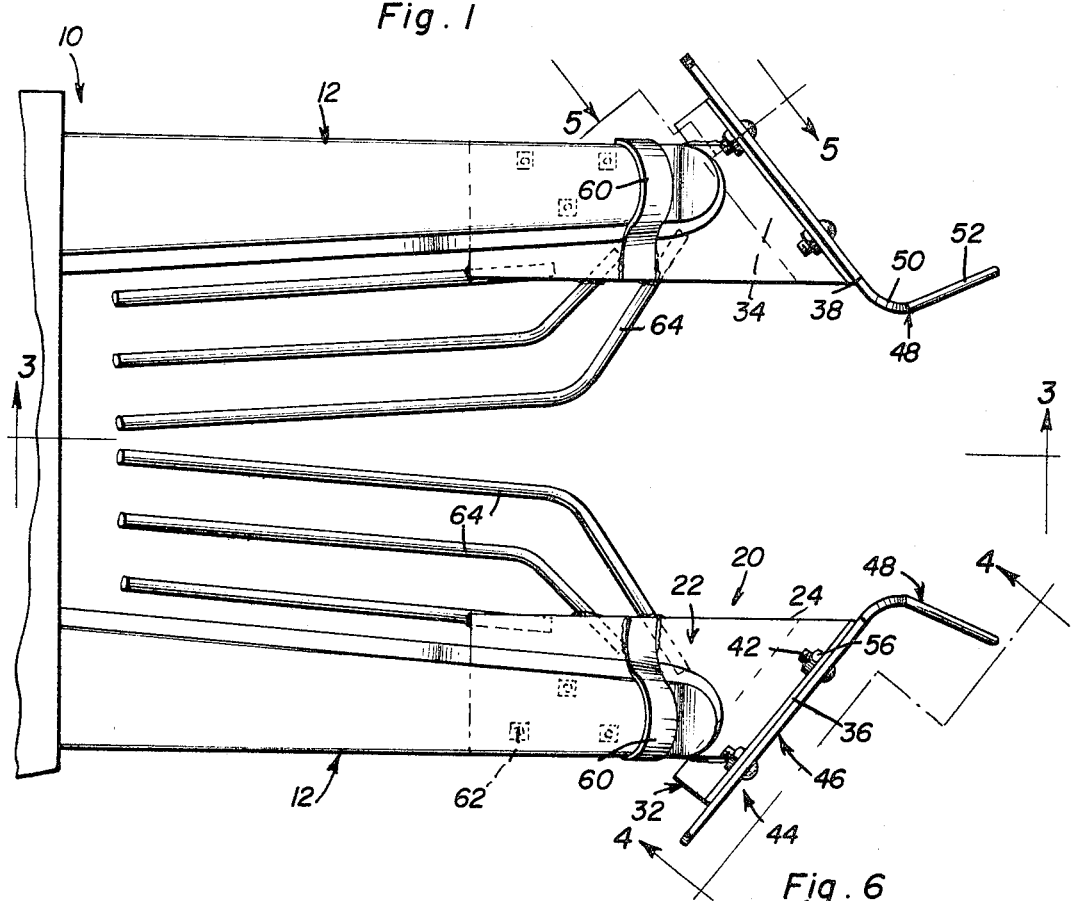
FIGURE 1 is a top plan view of the forward portion of a cotton retrieving machine having a pair of the attachments which constitute the instant invention mounted on the pair of cooperating gathering shoes or boots.
Figure 6:
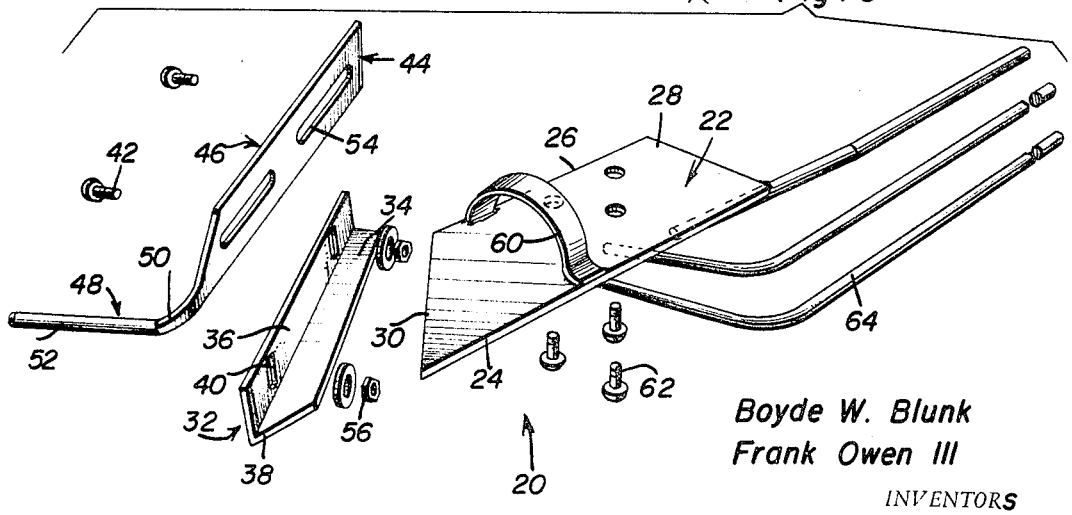
FIGURE 6 is an exploded perspective view of the various detachable components of the cotton retrieving attachment of the instant invention.
Figure 2:
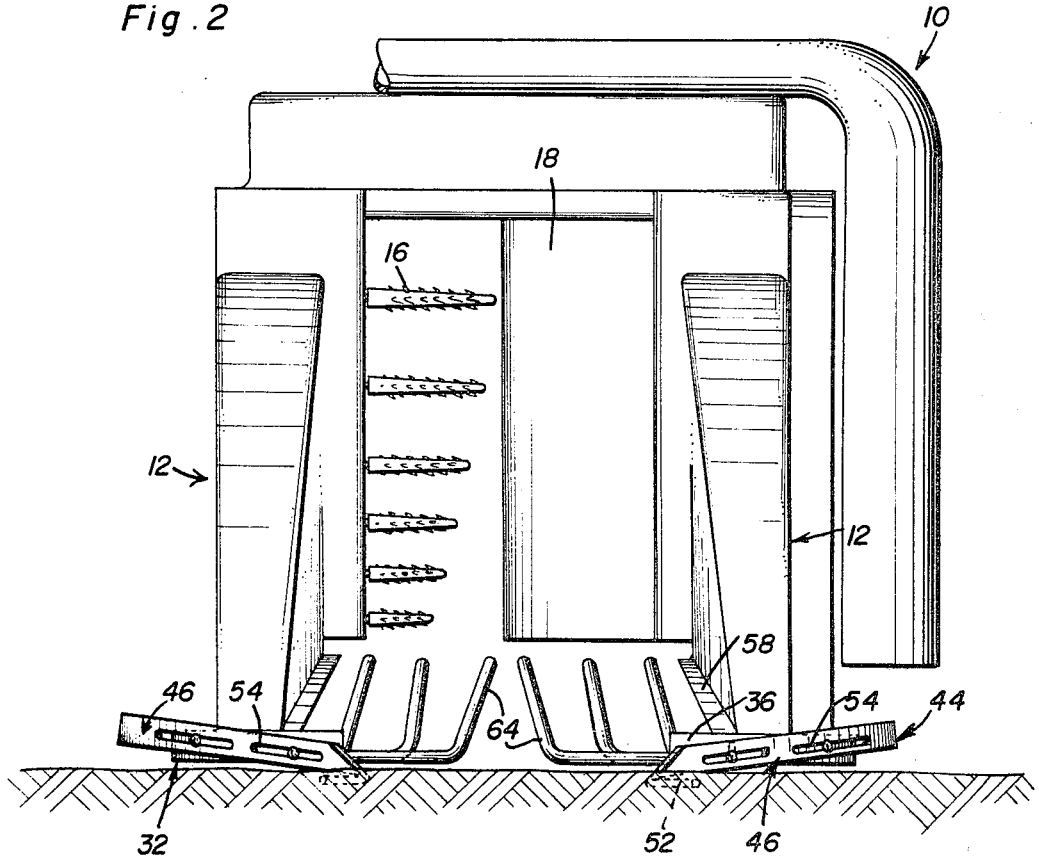
FIGURE 2 is a front elevational view of the machine of FIGURE 1.
Figure 5:
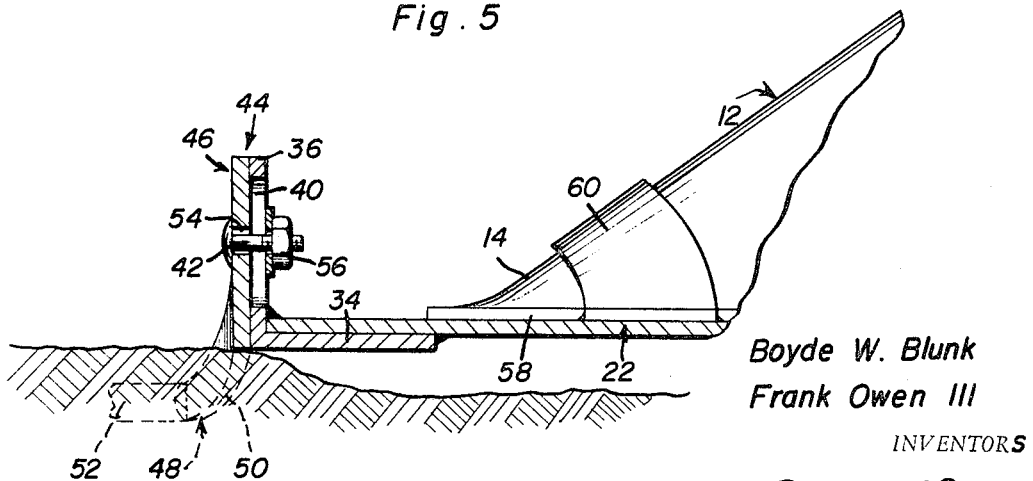
FIGURE 5 is an enlarged partial cross-sectional view taken substantially on a plane passing along line 5—5 in FIGURE 1.
Figure 3:
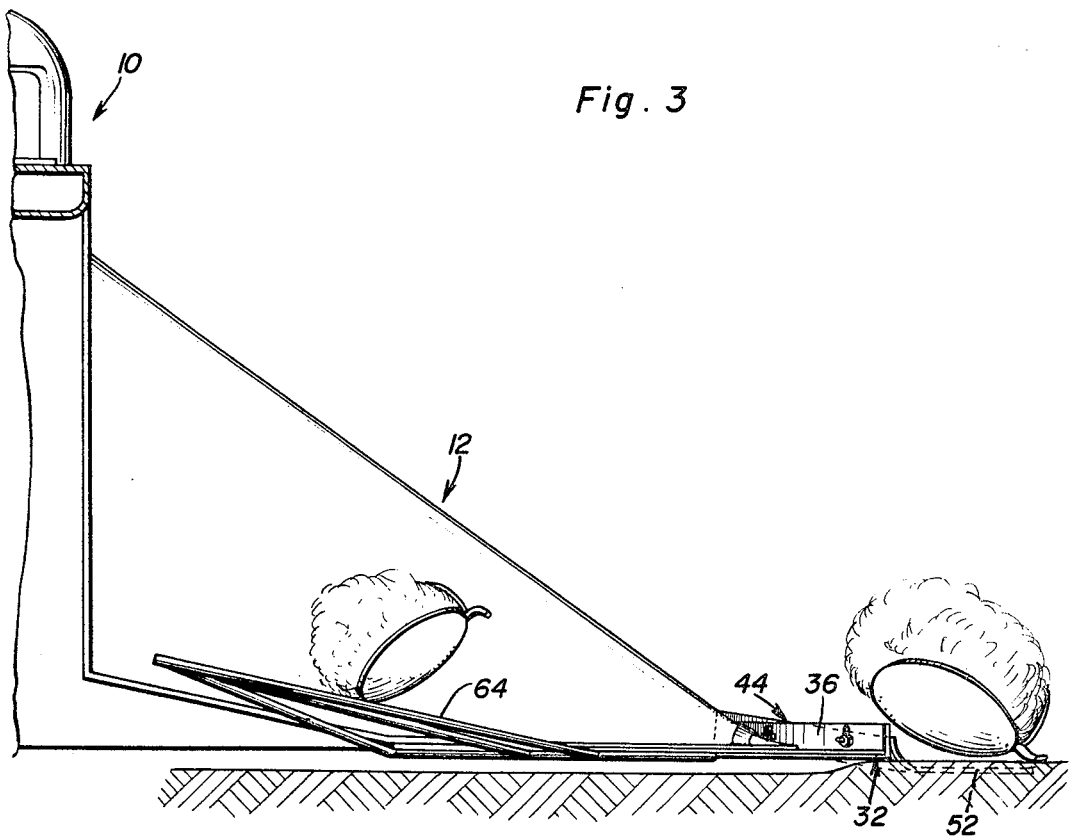
FIGURE 3 is a vertical cross-sectional view taken substantially on a plane passing along line 3—3 in FIGURE 1.
Figure 4:
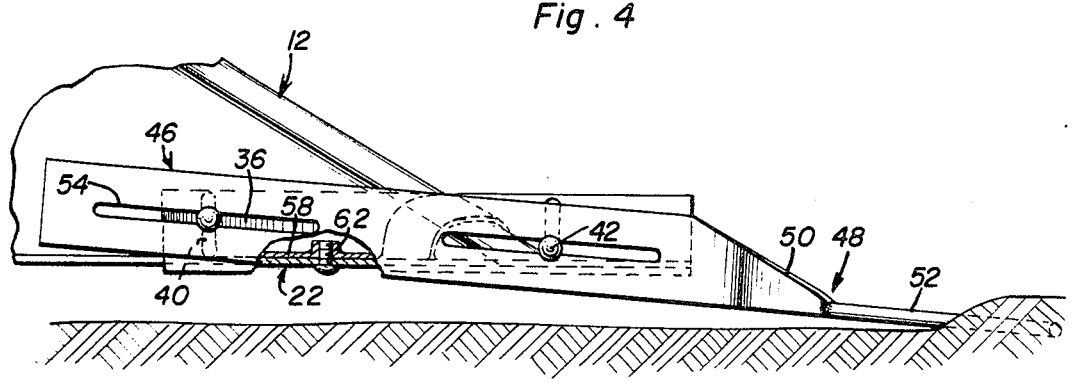
FIGURE 4 is a partial enlarged elevational view, with portions broken away, taken substantially on a plane passing along line 4—4 in FIGURE 1.

Referring now more specifically to the drawings, reference numeral 10 is used to generally designate a conventional cotton retrieving machine of the type including at least one pair of forwardly directed cooperating gathering shoes or boots 12 which taper downwardly and forwardly terminating in a generally conical leading end portion 14. These shoes 12, as will be appreciated, are positioned so as to receive a row of cotton therebetween and function so as to guide and direct the cotton stalks inwardly and rearwardly as the machine 10 advances for engagement of the stalks by the cotton removing apparatus which, as an example, might consist of a plurality of rotating spindles 16 and an opposed pressure plate 18.

As noted supra, it is a particular object of the instant invention to provide an attachment for such a machine, one mountable upon each of the shoes 12, which will function so as to insure a retrieving of substantially all of the cotton. This attachment, in the drawings, has been generally designated by reference numeral 20.

The attachment 20 includes a relatively elongated flat mounting plate 22 having inner and outer parallel side edges 24 and 26, a rear edge 28, and a forward edge 30 forming an acute angle with the inner edge 24 and an obtuse angle with the outer edge 26.

Secured to the forward portion of the plate 22, and paralleling the angular forward edge 30, is a mounting angle 32 having the horizontal leg 34 thereof underlying the forward portion of the plate 22 and welded thereto with the vertical leg 36 thereof being butted against the forward edge 30 along the full length thereof and projecting vertically thereabove. As will be noted from the drawings, the inner end 38 of the mounting angle 32 is beveled so as to conform to the inner edge 24 of the mounting plate 22. The vertical leg 36 of the mounting angle 32 includes a pair of laterally spaced vertically elongated mounting slots 40 therein which are to adjustably receive mounting bolts 42 utilized in mounting the combined plow and gathering unit 44.

The combined plow and gathering unit 44 includes a flat elongated rectangular blade portion 46 terminating at one end in a rod-like gathering portion 48. The blade portion 46 consists of a vertically orientated plate, rectangular and flat throughout a major portion thereof and, at the inner end thereof, having the upper edge thereof angled downwardly toward the lower edge and terminating in a forwardly curved strip-like portion 50 to which a straight spring steel gathering rod 52 is welded. The forwardly curved reduced portion 50 of the plow blade forming plate and the forwardly projecting rod 52 combine so as to form the gathering portion of the unit 44, this gathering portion, as will be appreciated from FIGURE 1, being angled forwardly and outwardly so as to provide a wide gathering mouth.

The unit 44 is to be secured to the mounting angle 32 by the mounting bolts 42, and as such, a pair of longitudinally elongated spaced mounting slots 54 are provided in the flat plate which defines the plow blade portion 46 of the unit 44. As will be appreciated, through the vertically elongated mounting slots 40 and the horizontally elongated mounting slots 54, a substantial degree of adjustability has been introduced into the unit 44 so as to enable a proper location of the forwardly extending gathering rod 52 prior to a rigid, although releasable, locking of the unit 44 to the mounting angle 32, this being achieved in an obvious manner through the provision of locking nuts 56 on the mounting bolts 42. In actual usage, in order to insure a proper inward directing of the stalks and a retrieval of substantially all of the cotton, including any which might have fallen on the ground, the unit 44 is to be so adjusted as to enable a traveling of the gathering rod 52 just below the surface of the ground, at a depth of approximately ¼". It will be noted that this movement of the gathering rod 52 below the surface of the ground is to be achieved by an actual downwardly angling of the unit 44 both inwardly and forwardly in a manner whereby only the gathering portion 48 will engage below the ground, thereby insursuring the efficient gathering operation without actually interfering with the operation of the machine 10. At the same time, it will be appreciated that the plow blade defining portion 46 will function so as to outwardly direct rocks, dirt and the like, from the path of travel of the cotton receiving portion of the machine 10 so as to result in the retrieving of a substantially clean product.

The attachment 20 is to be mounted upon the corresponding machine shoe 12 with the outer edge 26 in general vertical alignment with the outer side of the shoe 12 with the inner edge 24 located inwardly of at least the tapered forward portion of the corresponding shoe 12. The mounting plate 22 itself is to be engaged flush against the bottom plate 58 of the shoe 12 and is to be affixed to the forward portion 14 of the shoe 12 by means of both a shoe straddling stirrup 60 and one or more mounting bolts 62. The stirrup 60 consists of a suitable strap having the opposite ends thereof affixed, as by welding, to the opposite side edge portions of the mounting plate 22 with the intermediate portion thereof arced so as to closely conform to the configuration of the forward portion of the shoe 12 for flush and snug engagement thereagainst through a rearward movement of the mounting plate onto the shoe 12 with the plate engaging with the bottom plate 58 of the shoe. Once the attachement 20 has been moved rearwardly onto the corresponding shoe 12 sufficiently so as to snugly engage the converging forward portion 14 of the shoe between the flat mounting plate 22 and the stirrup 60, the attachment 20 is locked to the shoe by one or more mounting bolts 62 extending upwardly through the mounting plate 22 and into threaded engagement with the shoe base plate 58. If so desired, the bolt or bolts 62 can be engaged within the bolt holes utilized in mounting the lift rods normally provided on machines of the type on which the attachment 20 of the instant invention is to be mounted, such lift rods of course being removed when utilizing the attachment.

Finally, the attachment of the instant invention includes a plurality of inwardly and rearwardly directed lift rods 64 which are both inwardly and upwardly angled so as to effectively achieve an inward and upward lifting of the stalks into the operating chamber of the machine 10. These rods 64, having the forward ends thereof either rigidly bolted or welded to the inner edge portion of the mounting plate 22, are so orientated relative to the corresponding shoe 12 as to commence the lifting and guiding function thereof substantially at the forward end of the shoe 12 and continue for the full length thereof.

From the foregoing, it should be appreciated that a highly unique cotton retrieving attachment has been defined, this attachment insuring a substantially complete recovery of all of the cotton, including that which may have fallen to the ground. The attachment, a self-contained unit including a plow portion for clearing a path forward of the retrieving machine, a gathering portion for riding immediately below the surface of the ground and retrieving and inwardly directing the cotton and stalks, and a plurality of lifting rods, is adapted for removable mounting upon a gathering shoe for cooperation with a similar attachment mounted on a cooperating shoe. The attachment further includes adjustability which enables its adaptation to various different types of machines and/or ground conditions in a manner so as to always insure a proper positioning of the gathering portion below the surface of the ground, this being achieved through an angular orientation of the combination plow and gathering unit so as to engage only the gathering portion with the ground and allow the remainder of the unit to remain generally above the surface of the ground so as to not interfere with the operation of the machine. The readily removable nature of the attachment is also of significance in enabling, in a simple and efficient manner, any maintenance thereof such as might be necessary. While not specifically mentioned supra, it should be appreciated that various modifications are contemplated within the scope of the instant invention. For example, the angular orientation of the gathering portion 48 can be varied, and, if so desired, the leading end of the gathering rod 52 itself can be upwardly and rearwardly curved so as to facilitate its movement through the earth. The specific configuration of the stirrup 60 can also be modified so as to enable the accommodation of particularly shaped shoes 12.

What is claimed as new is as follows:

1. For use in conjunction with a gathering shoe or boot on a cotton picking machine or the like, a retrieving attachment, said attachment comprising a generally horizontal flat mounting plate, said plate including forward and rear ends and opposed inner and outer side edges, mounting means associated with said mounting plate for rigidly affixing said mounting plate on the leading portion of a gathering shoe, said mounting plate being of a width at least approximately that of the leading portion of the gathering shoe, a combined plow and gathering unit, said unit including an elongated vertically orientated flat plow blade portion and a gathering rod portion affixed to one end of said blade portion and extending laterally at an angle to the plane of said blade portion, means mounting said plow and gathering unit transversely across the forward end of said mounting plate from the inner to the outer side edges, said rod portion being on the inner side edge and being generally forwardly directed relative to said mounting plate, said rod portion projecting downwardly and outwardly forward of the mounting plate below the plane of the mounting plate, said plow blade portion being rearwardly angled from the inner side edge to the outer side edge, and a plurality of lift rods having the forward ends thereof fixed to the inner side edge portion of the mounting plate, said lift rods extending inwardly, upwardly and rearwardly from the forward ends thereof.

2. The device of claim 1 wherein said means mounting the plow and gathering unit is both horizontally and vertically adjustable so as to enable a variation in the orientation of the unit.

3. The device of claim 2 wherein said means mounting the plow and gathering unit includes a vertical flange-like member fixed to the forward end of the mounting plate, said member including a pair of spaced vertically elongated bolt receiving slots therein, said flat plow blade portion including a pair of generally horizontally elongated bolt receiving slots therein, said flat plow blade portion including a pair of generally horizontally elongated bolt receiving slots therein alignable generally transversely across the member slots for the reception of mounting bolts therethrough.

4. The device of claim 2 wherein said mounting means associated with said mounting plate includes a shoe receiving stirrup fixed to said plate and arching upwardly thereover for snug engagement over the leading end portion of a shoe, and at least one bolt accommodating aperture through said mounting plate.

5. For use in conjunction with a gathering shoe or boot on a cotton picking machine or the like, a retrieving attachment, said attachment comprising a generally horizontal flat mounting plate, said plate including forward and rear ends and opposed inner and outer side edges, mounting means associated with said mounting plate for rigidly affixing said mounting plate on the leading portion of a gathering shoe, said mounting plate being of a width at least approximately that of the leading portion of the gathering shoe, a combined plow and gathering unit, said unit including an elongated vertically orientated flat plow blade portion and a gathering rod portion affixed to one end of said blade portion and extending laterally at an angle to the plane of said blade portion, means mounting said plow and gathering unit transversely across the forward end of said mounting plate from the inner to the outer side edges, said rod portion being on the inner side edge and being generally forwardly directed relative to said mounting plate, and a plurality of lift rods having the forward ends thereof fixed to the inner side edge portion of the mounting plate, said lift rods extending inwardly, upwardly and rearwardly from the forward ends thereof.

References Cited

UNITED STATES PATENTS

| | | | |
|---|---|---|---|
| 1,551,350 | 8/1925 | Ward | 172—159 |
| 2,650,462 | 9/1953 | Skaggs | 56—30 |
| 2,731,780 | 1/1956 | Witt | 56—119 |
| 2,784,544 | 3/1957 | Rust | 56—119 |
| 2,818,700 | 1/1958 | Blackman | 56—33 |
| 3,045,764 | 7/1962 | Johnson | 172—686 X |
| 3,291,223 | 12/1966 | Hammons | 172—686 |

ABRAHAM G. STONE, *Primary Examiner.*

PASQUALE A. RAZZANO, *Assistant Examiner.*

U.S. Cl. X.R.

143—43; 287—58